(12) United States Patent
Bakshi

(10) Patent No.: US 7,989,646 B2
(45) Date of Patent: Aug. 2, 2011

(54) BIODIESEL PROCESS

(76) Inventor: Amarjit S. Bakshi, Houston, TX (US)

( * ) Notice: Subject to any disclaimer, the term of this patent is extended or adjusted under 35 U.S.C. 154(b) by 0 days.

(21) Appl. No.: 11/540,180

(22) Filed: Sep. 29, 2006

(65) Prior Publication Data

US 2008/0097114 A1    Apr. 24, 2008

(51) Int. Cl.
*C11B 3/00* (2006.01)
(52) U.S. Cl. ........................................ 554/174
(58) Field of Classification Search ............... 554/174
See application file for complete search history.

(56) References Cited

U.S. PATENT DOCUMENTS

| | | | |
|---|---|---|---|
| 4,698,186 A * | 10/1987 | Jeromin et al. | 554/174 |
| 6,090,959 A * | 7/2000 | Hirano et al. | 554/169 |
| 2005/0274065 A1* | 12/2005 | Portnoff et al. | 44/605 |

* cited by examiner

*Primary Examiner* — Deborah D Carr

(57) ABSTRACT

This invention covers a process for making biodiesel from vegetable oils and animal fat with a simple hetrogeneous catalyst providing high yield and reaction rates under moderate conditions. The process is designed so as to enhance the yield by pretreatment step of esterification if required. The process provides gravity separation and any pretreatment/distillation/stripping, if needed before sending Biodiesel and glycerine to storage. The process provides heterogeneous catalysts so as to reduce the waste from the system and also it reduces the utilities and chemical cost. The process is optimized, simple in operation, economical, providing best yields compared to any processes in the market.

5 Claims, 2 Drawing Sheets

RHT Biodiesel Process

RHT Biodiesel Process

BIODIESEL PROCESS

FIELD OF THE INVENTION

The invention relates to producing biodiesel from palm oil, Rape seed, vegetable and animal product that are all fatty acids with even number of carbon atom typically 12 to 22 atoms. It does not produce sulfur dioxide, less carcinogen fumes and less black smoke. The lack of sulfur in the biodiesel means it meets all international specification once the boiling range is right, and these are comparable to hydrocarbon diesel. The triglyceride feeds make biodieseel, reacting these triglycerides with methanol/ethanol or higher alcohols which all produce biodiesel in the acceptable boiling range. Methanol is most commonly used for the biodiesel production as being the cheapest alcohol, hence provides better economics. Biodiesel is produced by vegetable oils and animal fats (triglycerides) into fatty acid methyl esters. The process requires a pretreatment step to remove the free fatty acids so as to enhance the yield of esters. The first step is esterification of the free fatty acid, (if these are more than 3 wt % in the feed) with methanol. These triglycerides are than converted by transesterfication reaction with methanol to form methyl esters of those oils/. Fats, and glycerine is produced as a byproduct. Glycerine is separated from the methyl ester that is biodiesel, by phase separation by gravity settling due to density differences.

BACKGROUND OF THE INVENTION

With the hydrocarbon fuels prices going up and the renewable fuel mandate and the environmental advantages of the biodiesel as mentioned above it is expected that there will be activity in this area so as to supplement the hydrocarbon fuels, which will help in reducing demand of Crude oil.

The process is based on esterification of five fatty acid, a pretreatment step so as to enhance the yield of methyl esters in transesterification reaction. The esterification reaction is done with free fatty acids in Feed with methanol in the presence of a cation acid ion exchange resin catalyst Lewatit K 2621, K 2620 or equivalent (Rohm Haas Amberlyst 15 or 35 or Dowex M 31) at a WHSV of 2 to 5. This removes most of Free Fatty acids and increases the yield of Biodiesel. The reaction conditions are in 100 to 200 F temperature and pressure of 20 to 150 psig (preferably 50 psig and temperature of 140 F) to perform this reaction in the Esterification reactor.

The second reaction to is transesterification of triglycerides from oil or fats with methanol in the presence of alkaline catalyst. The catalysts that are being used are in homogeneous form, predominantly KOH. New processes have started using hetrogeneous catalyst that improves the process in removing major liquid wastes from this process, which are due to homogeneous catalyst use. RHT-Biodiesel process is based on hetrogeneous catalyst like Potassium carbonate, Barium sulfate, Calcium aluminate, Cobalt carbonate, Polyamine, Ammonical metal-oxide. Sodium, Potassium and Calcium Phosphates, mixture of metal oxides with alumina, Magnesium methoxide, Calcium oxide. Calcium ethoxide and Boron hydroxide, Calcinated hydro zeolite, and any other alkaline heterogeneous compounds available in market including the Anion ion exchange basic catalyst which can also be used like Amberlyst A-21, Amberlyst A26 or equivalent but not limited to, at a WHSV of 2 to 5. The operating conditions for transesterification are similar to esterification reaction.

The transesterification reactor effluent provides 100 percent conversion of triglycerides to Methyl Esters of the Fatty acid/triglycerides feeds. This is sent to gravity separator where glycerine settles at the bottom, as its specific gravity is 1.2 to 1.3. The methyl esters specific gravity is in the range of 0.85 to 0.9.

The biodiesel is taken from top of the separator and is washed with water before sending it to the storage. The glycerine is taken from the bottom of the gravity separator and is also washed with water before sending it to storage. Water wash will contain methanol that can be recovered by distillation and recycled to the process.

SUMMARY OF TIM INVENTION

The process in this art claims that vegetable oils and animal fats can be converted to Biodiesel that has properties very close to the petroleum based diesel and actually produces fewer emissions than petroleum based diesel. The biodiesel refers to esters made from the vegetable or animal fats. At present biodiesel is being mixed with petroleum based diesel in some markets, but it can be used on its own in the current diesel engines. With the flash point of 220 to 320 F, OSHA has classified biodiesel as non-flammable liquid.

The process in this art claims that the vegetable oils and animal fat can be make an ester by suing heterogeneous catalyst which are alkaline solids compounds or with basic resin catalysts. The process first converts the free fatty acid as these reduce the reaction rates, yield and phase separation is difficult due to Free Fatty Acids being present, due to gravity differences. First Vegetable oils are esterified (if free fatty acids are more than 3% in the feed) reacting with methanol in the presence of acid resin catalyst at moderate temperatures and than transesterified in the second reactor to Methyl Ester oil (biodiesel) by transesterification reaction, which is triglycerides reacting with methanol to form biodiesel in the presence of basic datalyst at moderate temperatures and pressure, both the reactions provide WHSV of 2 to 3 to maximize the reaction rates. The art here claims that by using hetrogeneous catalyst reduces the water or neutralization/soap produced compared to the conventional process. Glycerine is produced as a by-product of this process. An alternate solution, to remove glycerine from the reactor catalyst is also proposed as reaction rates are reduced due glycerine sticking to catalyst, together with the hetrogeneous catalyst application which reduces the waste treatment problem.

The reactor effluent is separated in a simple gravity settler and sent to storage after water wash. The final product can be vacuum stripped if so desired but there are not many requirements for it in this process.

The art is in the esterification and transesterification reaction catalyst selection that enhances the yield and reduces the liquid effluents from the process described. Additionally it provides appreciable advantages of additional transesterification reactor use in the process so as to get the maximum reaction rates and on stream factor.

The art of the process provides the spare reactor to be washed with hot solvent so as to remove the residual glycerol from the catalyst that reduces the reaction rates. This solvent is taken off site for stripping of the solvent from glycerine. The solvent is recycled where as recovered glycerine can be sent to the glycerine product.

The reactions are also done at moderate temperatures that are less energy intensive than conventional process.

This unique feature will be apparent to one who is skilled in the art from the figures and claims and brief description of the FIGS. 1 and 2.

DETAILED DESCRIPTION OF THE INVENTION

Figure 1:
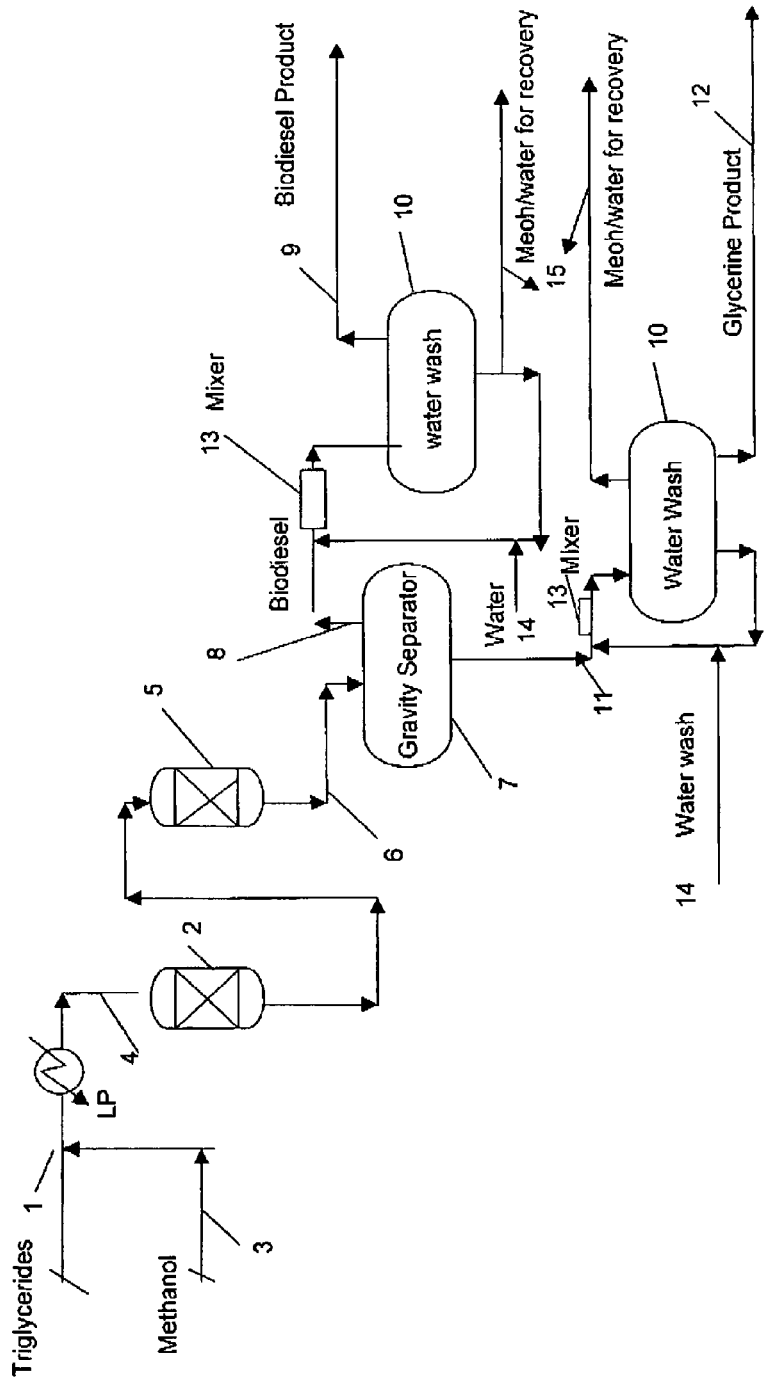
FIG. 1 is a simplified process flow diagram of the process, where the feed of vegetable oil or animal fats is pumped from storage to the operating pressure of 50 to 80 psig stream 1. The feed of vegetable oil etc stream 1 is mixed with methanol/alcohol stream 3 in the molar ratio of 6 to 8 vegetable/methanol which is adequate for esterification and transesterification reactions, and understood that are supplied to item 2 and 5 which esterification and transesterification reactors. The feed is heated to the reaction temperature 120 to 200 F, (preferably 160 F) and stream 4 is fed to esterification reactor item 2 so as to convert all the free fatty acid, if these are present more than 3 percent in the feed. The WHSV in this reactor is kept 2 to 10 (preferably at about 2 to 5). The reactor contains Acid cation resin catalyst Lewatit K 2621, K2620 or equivalent (Rohm Haas Amberlyst 15 or 35 or Dowex M 31). This removes 99.9% of Free Fatty acids in the reactor (item 2) and the effluent of item 2 is fed to the transesterfication reactor item 5. Where 3 moles of methanol react with the triglyceride to produce 3 moles of oil methyl ester (biodiesel) and one mole of glycerine. The pressure and temperatures are essentially the same as for esterification reactor item 2. The transesterification reactor item 5, has heterogeneous catalyst from following compounds, Potassium carbonate, Barium sulfate, Calcium aluminize, Cobalt carbonate, Polyamine, Ammonical metal-oxide, Sodium, Potassium and Calcium Phosphates, mixture of metal oxides with alumna, Magnesium methoxide, Calcium oxide, Calcium ethoxide and Boron hydroxide, Catcinated hydro zeolite, any other alkaline hetrogeneous compounds available in market including the Anion ion exchange basic catalyst which can also be used like Amberlyst A-21, Amberlyst A26 or equivalent but not limited to. The WHSV for the catalyst is in the range of 2 to 10 but preferably 2 to 5 will provide essentially 100% conversion to Methyl ester of oil (biodiesel). The transesterification reactor effluent stream 6 is sent to gravity separator item 7. The biodieseel product is taken from the top of the separator as stream 8, and is passed through mixer item 13, where water is being circulated from water wash drum item 10 which is supplied for ester and glycerine to remove the methanol by washing with water. The make up water is supplied as stream 14, and washed methanol/alcohol and water stream is withdrawn as stream 15 and is sent to methanol recovery. Water wash is an additional optional operation for stream 8 and provides stream 9 as water wash devoid of any traces of methanol or alcohol. Otherwise in some cases stream 8, should be good enough to send it to the storage. The Biodiesel product is taken as Stream 9 after water wash or stream 8 without waterwash. Water wash will provide excess methanol to be extracted and recovered by normal distillation or pure methanol that is recycled back to the reactor. The bottom from the separator item 7 Stream 11 is taken and is good to be sent as glycerine product to storage before water wash. But to have better quality glycerine byproduct, stream 11, is passed through mixer item 13, where water is being circulated from water wash drum item 10. The make up water is supplied as stream 14, and washed methanol/alcohol and water stream is withdrawn as stream 15 and is sent to methanol recovery. Water wash is an additional optional operation for stream 11 and provides stream 12 as water wash devoid of any traces of methanol or alcohol. Otherwise in some cases stream 11, it should be good enough to send it to the storage. Glycerine is taken as stream 12 after water wash and sent to storage and methanol/water mixture is sent to same distillation column to purify the methanol that is recycled to the front of the process. These reduce the methanol make up requirements.
Figure 2:
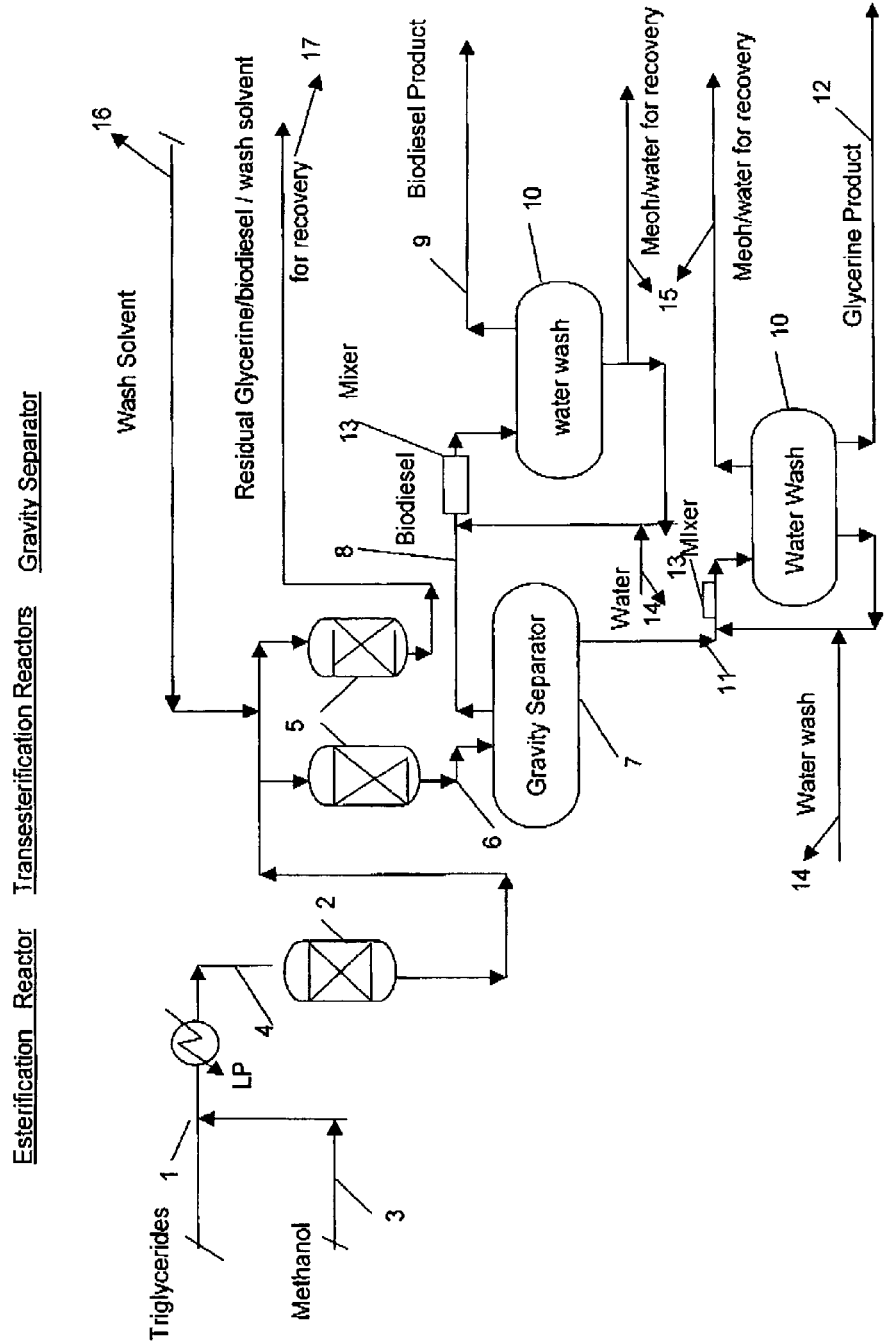
FIG. 2 is alternate mode of the simple process flow diagram or the above flow scheme and all things are same (streams and equipment items) except a spare transesterification reactor Item 5 is provided so as to remove the glycerine from the reactor item 5, which reduces the reaction rates, only these additional streams and operation will be explained here in this description as all the other streams and equipment is the same as in FIG. 1. Once the reaction rates are reduced the one of the spare transesterification reactor item 5, is switched and taken off service and other is put in production mode. The spare reactor item 5 which is taken off from production mode, is washed with hot solvent stream 16 so as to remove residual glycerine and trace biodiesel and solvent, as stream 17 is sent for recovery of different components. This extra spare reactor item 5, provides higher reactions rates and on stream factor enhancing the yield and productivity of the process.

The major art and know how described here is a disclosure of producing Biodiesel from vegetable out animal fats, first removing the Free fatty acids by esterification with methanol in the presence of with hetrogeneous catalyst in the fixed bed reactor so as to improve the yield and reaction rates. The effluent from this reactor is transesterfied with methanol with hetrogeneous catalyst in the fixed bed reactor. The products are separated in gravity separator and are washed and sent to storage. As mentioned earlier optimum operating conditions and WHSV of 2 to 5 is provided for both esterification and treansesteritication reactions, so as to get the reaction to essentially 100% completion.

The alternate option is provided so as to enhance the reaction rates and also on stream factor for transesterification reaction by providing additional spare reactor item 5. Only one reactor is in operation and when the activity of catalyst is reduced due to glycerol being adhered to catalyst, the reactor is taken from the service and alternate spare reactor is put in service. The reactor which is taken of service is washed with hot solvent so as to regain the catalyst is activity.

Based on the configuration and feed compositions following conditions will be required for the Esterification (required if Free Fatty acids are more than 3% in the Feed) and Transesterification Fixed bed reactors, and could be down flow or upflow configuration:

| | |
|---|---|
| Inlet Temp (F.) | 100 to 200 (120 to 160 F. preferable) |
| Pressure (psig) | 50-to 80 |
| WHSV (hr)$^{-1}$ | 2 to 10 (preferably 2 to 5) |
| Free fatty acids (FFA) and tryglycerides Conversion 99.9% | |

Reaction Chemistry
Vegetable Oil/Animal Fat Transesterification Reactions:

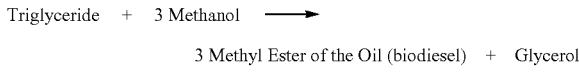

Triglyceride + 3 Methanol ⟶ 3 Methyl Ester of the Oil (biodiesel) + Glycerol

Comparison of the Diesel/Biodiesel Properties:

| Fuel Property | Diesel | Biodiesel |
|---|---|---|
| Fuel Standard | ASTM D 975 | ASTM P S 121 |
| Fuel Composition | C10-C21 HC | C12-C22 FAME |
| Lower Heating Value Btu/gal | 131 | 117 |
| Kinemetic Vis @ 40 C. | 1.3-4.1 | 1.9-6.0 |
| SG at 60 F. | 0.85 | 0.88 |

-continued

| Fuel Property | Diesel | Biodiesel |
|---|---|---|
| Water wppm | 161 | 500 |
| Carbon | 87 | 77 |
| Hydrogen | 13 | 12 |
| Oxygen | 0 | 11 |
| Sulfur wppm | 15-500 | 0 |
| Bp F | 380-650 | 370-340 |
| Flash Pt F | 140-175 | 210-140 |

What RHT-Biodiesel Process claim are:

1. A method of producing a biodiesel comprising:
   i. reacting a vegetable/animal fat or oil with an alcohol in the presence of an acidic catalyst in a esterification reactor wherein the WHSV in the esterification reactor is between 2 and 5, the pressure in the esterification reactor is between 50 and 80 psi and the temperature in the esterification reactor is between 120 and 200° F. to convert the free fatty acids to esters;
   ii. reacting the resulting reaction mixture with an alcohol in a transesterification reactor in the presence of an alkaline catalyst wherein the WHSV in the transesterification reactor is 2 to 5, wherein the pressure within the transesterification reactor is between 50 to 80 psig and the temperature in the transesterification reactor is between 120 and 200; and
   iii. separating the reaction mixture into a biodiesel product and a glycerol byproduct.

2. The method of according to claim 1 wherein the alkaline catalyst is selecting from a group consisting of sodium, potassium, and calcium phosphates, calcium oxide, magnesium methoxide, calcium ethoxide, boron hydroxide, calcinated hydro-zeolite, Amberlyst A-21 and A-26.

3. The process according to claim 1 further comprising the step of removing impurities from the biodiesel product and glycerol byproduct by vacuum distillation or stripping.

4. A method of producing a biodiesel comprising the steps of:
   i. feeding a first stream containing free fatty acids as a vegetable/animal fat or oil and a second stream containing an alcohol to a first reactor containing an acid esterification catalyst wherein the combined WHSV in said first reactor is between 2 and 5;
   ii. reacting the free fatty acid with a portion of the alcohol in the first reactor at a reaction temperature of between 120 and 200° F. and reaction pressure of between 50 and 80 psig to convert essentially all of the free fatty acids to esters and produce an effluent containing esters and unreacted alcohol;
   iii. feeding the effluent from the first reactor to a second reactor containing an alkaline transesterification catalyst wherein the WHSV in the second reactor is between 2 and 5;
   iv. reacting the esters formed in the first reactor with a portion of the remaining alcohol at a reaction temperature of between 120 and 200° F. and reaction pressure of between 50 and 80 psig to form a mixture of biodiesel product and glyerol product;
   v. feeding the mixture of biodiesel product and glyerol product to a separator wherein biodiesel product is separated from glycerol product;
   vi. subjecting the biodiesel product to a water wash to remove unreacted alcohol;
   vii. subjecting the glycerol product to a water wash to remove unreacted alcohol; and
   viii. recovering the alcohol from the water and recycling the alcohol as feed to step i.

5. A method of producing a biodiesel comprising the steps of:
   i. feeding a first stream containing free fatty acids as a vegetable/animal fat or oil and a second stream containing an alcohol to a first reactor containing an acid esterification catalyst wherein the combined WHSV in said first reactor is between 2 and 5;
   ii. reacting the free fatty acid with a portion of the alcohol in the first reactor at a reaction temperature of between 120 and 200° F. and reaction pressure of between 50 and 80 psig to convert essentially all of the free fatty acids to esters and produce an effluent containing esters and unreacted alcohol;
   iii. feeding the effluent from the first reactor to a second reactor containing an alkaline transesterification catalyst wherein the WHSV in the second reactor is between 2 and 5;
   iv. reacting the esters formed in the first reactor with a portion of the remaining alcohol in the second reactor at a reaction temperature of between 120 and 200° F. and reaction pressure of between 50 and 80 psig to form a mixture of biodiesel product and glyerol product;
   v. feeding the mixture of biodiesel product and glyerol product to a separator wherein biodiesel product is separated from glycerol product;
   vi. subjecting the biodiesel product to a water wash to remove unreacted alcohol;
   vii. subjecting the glycerol product to a water wash to remove unreacted alcohol;
   viii. recovering the alcohol from the water and recycling the alcohol as feed to step i.
   ix. when the conversion of esters in the second reactor declines to unacceptable levels, simultaneously:
      1. stopping feed to the second reactor and starting the feed to a third reactor containing an alkaline transesterification catalyst wherein the WHSV in the second reactor is between 2 and 5 where the esters formed in the first reactor are reactred with a portion of the remaining alcohol in the third reactor at a reaction temperature of between 120 and 200° F. and reaction pressure of between 50 and 80 psig to form a mixture of biodiesel product and glycerol product; and
      2. feeding a solvent to the second reactor to remove built up esters, transesters and unreacted fatty acids; and
      3 feeding the mixture from step ix 1. to step v.

* * * * *